Patented May 5, 1925.

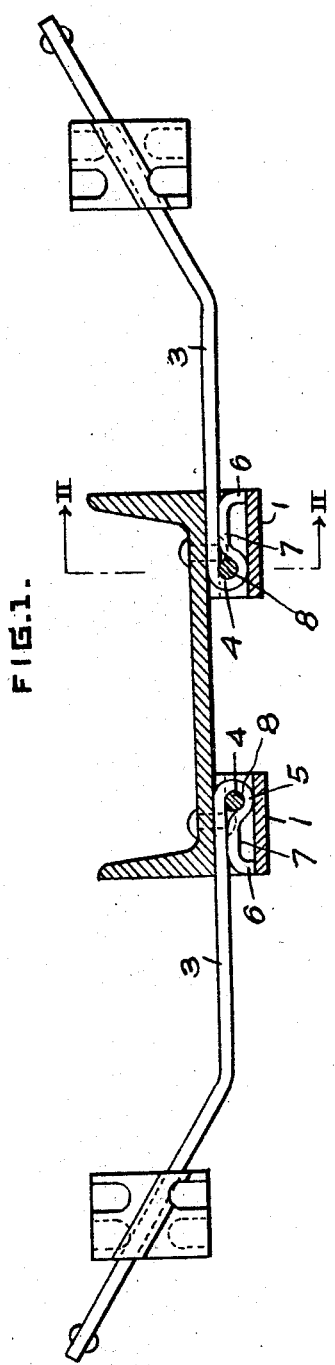
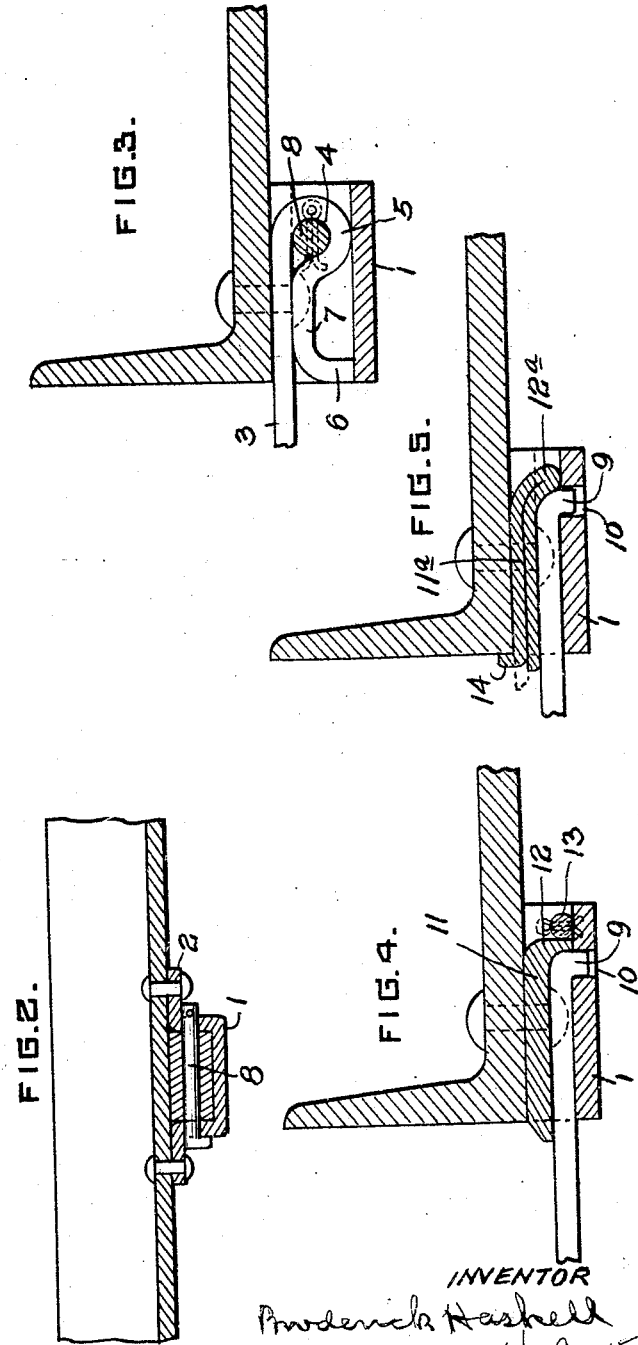

1,537,029

UNITED STATES PATENT OFFICE.

BRODERICK HASKELL, OF FRANKLIN, PENNSYLVANIA, ASSIGNOR TO DAVIS BRAKE BEAM COMPANY, OF JOHNSTOWN, PENNSYLVANIA, A CORPORATION OF PENNSYLVANIA.

SECURING BRAKE-BEAM SUPPORTS TO SPRING PLANKS.

Application filed July 8, 1924. Serial No. 724,802.

*To all whom it may concern:*

Be it known that I, BRODERICK HASKELL, residing at Franklin, in the county of Venango and State of Pennsylvania, a citizen of the United States, have invented or discovered certain new and useful Improvements in Securing Brake-Beam Supports to Spring Planks, of which improvements the following is specification.

It is practically the universal practice to connect brake beams to trucks by means of hangers which pivotally engage beams of the truss type at points in line with the compression member, and hence there is a tendency due to the unbalanced weight of the tension member and strut to so turn the beam on its pivotal supports that the upper ends of the shoes will bear on the wheel treads in advance of other portions of the shoes, and will be more rapidly worn than other portions of the shoes. Since the introduction of steel wheels which can be turned down and re-used, the unequal wear of the shoes is increased. In order to prevent the turning of the beam on the hangers, resort has been had to brake beam supports, which consist of rails secured to some part of the truck, as the spring plank, and project laterally therefrom into such position relative to the strut or tension member of the beam as to prevent the turning of the beam on its pivotal points while permitting the movement of the beam towards and from the wheels.

As in use the brake beam or its supporting rails may be so injured as to require removal for repair and replacement, a simple and readily accessible manner of securing the rails to the truck is very desirable.

The invention described and claimed herein consists generally in providing an element of the truck, as the spring plank, with pockets for the reception of the inner ends of the supporting rails and means for locking the rails from longitudinal movement.

In the accompanying drawings forming a part of this specification, Fig. 1 is a sectional view of a truck spring plank and showing the improved means for attaching the supporting rails thereto. Fig. 2 is a sectional view on a plane indicated by the line II—II, Fig. 1. Fig. 3 is a sectional view on an enlarged scale illustrating the construction shown in Fig. 1; Figs. 4 and 5 are sectional views illustrating modifications of the construction shown in Figs. 1, 2 and 3.

In the practice of the invention the pockets consist of trough shaped pieces 1 provided with flanges 2 secured to the underside of the spring plank by bolts or rivets passing through the flanges and the web of the spring plan. In the construction shown in Fig. 1, the inner portions of the rails 3 are bent back on the bodies of the rails in such manner as to form eyes 4, which will be wholly to one side of the body of the rail, thereby forming bearing portions 5. Additional bearing points 6 are formed suitable distances from the bearings 5, preferably by bending outward the ends of the portions 7 of the rails. These bearing points are so formed relative to the vertical depth of the pocket that the inner portion of the rail will, when inserted into the pockets, bear firmly against the upper wall of the pocket, which in the construction shown, is the underside of the spring plank. The rails are held in position in the pockets by means of pins 8 passing through the sides of the pockets and the eyes 4 of the rails.

In the construction shown in Fig. 4, lugs are formed on the inner ends of the rails, said lugs being adapted to project into openings 10 in the lower walls of the pockets when the inner ends of the rail are inserted into the pockets. The lug 9 may be held in position by blocks 11 inserted between the rails and the upper sides of the pockets. The blocks are inserted through the rear ends of the pockets and are formed with laterally projecting fingers 12 adapted to bear against the rear ends of the rails and thereby prevent an outward movement of the locking block. Movement of the blocks in the opposite direction is prevented by a pin 13 passing through the pocket in the rear of the fingers 12. In lieu of locking the blocks from rearward by means of transverse pins as described, the block may be formed with an extension at their front ends, said extension being adapted to be bent upwards to bear against the sides of the spring plank, as shown in Fig. 4. This locking block 11ª can be conveniently formed by doubling a strip of metal on itself, bending the closed end to form the finger 12ª, bearing on the end of the rail and extending one of the members to form the part 14 adapted to be bent up against the sides of the spring plank as shown in Fig. 5.

It is characteristic of the constructions shown in Fig. 1 that the rails can be, by the removal of the pins 8, drawn from the pockets, while in the construction shown in Figs. 4 and 5, by the removal of the pin 13 in one case, or by the bending down of the extension 14 in the other case, the locking blocks can be removed, thereby permitting the withdrawal of the rails. It will be observed that the rail locking means is under the spring plank and therefore readily accessible.

I claim herein as my invention:

1. The combination of the spring plank of a car truck, brake beam supporting rails, pockets on the underside of the spring plank for the reception of the inner end of the rails, and removable means for locking the rails as against longitudinal movement.

2. The combination of the spring plank of a car truck, brake beam supporting rails, pockets secured to the underside of the spring plank for the reception of the inner end of the rails, and pins passing through the sides of the pockets for locking the rails as against longitudinal movement.

3. The combination of the spring plank of a car truck, brake beam supporting rails, provided at their inner ends with eyes, pockets on the underside of the spring plank for the reception of the inner ends of the rails and removable pins passing through the sides of the pockets and the eyes in the supporting rails.

4. The combination of the spring plank of a car truck, brake beam supporting rails having their inner ends bent to form eyes and supporting lugs, pockets on the underside of the spring plank for the reception of the inner ends of the rails and pins passing through the sides of the pockets and the eyes in the rails.

In testimony whereof, I have hereunto set my hand.

BRODERICK HASKELL.